United States Patent
Zhang et al.

(10) Patent No.: US 11,153,253 B2
(45) Date of Patent: Oct. 19, 2021

(54) SYSTEM AND METHOD FOR DETERMINING AND DELIVERING BREAKING NEWS UTILIZING SOCIAL MEDIA

(71) Applicant: VERIZON MEDIA INC., New York, NY (US)

(72) Inventors: Maria Zhang, Palo Alto, CA (US); Xue Wu, Sunnyvale, CA (US); Qichu Lu, Sunnyvale, CA (US); Bill Shapiro, Mountain View, CA (US)

(73) Assignee: VERIZON MEDIA INC., New York, NY (US)

( * ) Notice: Subject to any disclaimer, the term of this patent is extended or adjusted under 35 U.S.C. 154(b) by 706 days.

(21) Appl. No.: 14/729,614

(22) Filed: Jun. 3, 2015

(65) Prior Publication Data
US 2016/0359790 A1 Dec. 8, 2016

(51) Int. Cl.
*H04L 12/58* (2006.01)
*G06Q 30/02* (2012.01)
(Continued)

(52) U.S. Cl.
CPC .......... *H04L 51/32* (2013.01); *G06F 16/285* (2019.01); *G06Q 30/0252* (2013.01);
(Continued)

(58) Field of Classification Search
CPC .......... G06N 5/04; G06N 99/005; G06N 5/02; G06N 5/022; G06N 20/00; G06N 5/043; G06N 5/048; G06F 17/30539; G06F 17/30516; G06F 17/30958; G06F 17/30876; G06F 13/4208; G06F 17/30601; G06F 17/30893; G06F 16/9024; G06F 16/3329; G06F 16/367; G06F 16/84; G06F 16/90335; G06F 3/04847; G06F 16/285; G06F 16/00; G06Q 30/0269; G06Q 30/0241; G06Q 30/0277; G06Q 10/10; G06Q 50/01; G06Q 30/0255; G06Q 10/1053; G06Q 30/0201;
(Continued)

(56) References Cited

U.S. PATENT DOCUMENTS

| | | | |
|---|---|---|---|
| 2008/0255935 A1* | 10/2008 | Madhavan | G06Q 30/02 705/14.64 |
| 2016/0028840 A1* | 1/2016 | Krishnan | H04W 4/10 709/204 |
| 2016/0085869 A1* | 3/2016 | Magdy | G06F 16/9535 707/740 |

FOREIGN PATENT DOCUMENTS

EP 2937824 A1 * 10/2015 ............. G06Q 10/00

* cited by examiner

*Primary Examiner* — Chinyere Mpamugo
(74) *Attorney, Agent, or Firm* — James J. DeCarlo; Greenberg Traurig, LLP

(57) ABSTRACT

Disclosed are systems and methods for improving interactions with and between computers in a content system supported by or configured with personal computing devices, servers and/or platforms. The systems interact to identify and retrieve data across platforms, which data can be used to improve the quality of data used in processing interactions between or among processors in such systems. The disclosed systems and methods determine breaking or trending news stories from social media activity, which are then communicated to users via personalized delivery. Thus, the disclosed systems and methods leverage social data, expert knowledge and/or user feedback, which are all available on-line, to determine breaking news stories, which are then delivered to users in a personalized manner specific to each user.

19 Claims, 7 Drawing Sheets

(51) Int. Cl.
*G06F 16/28* (2019.01)
*H04L 29/08* (2006.01)

(52) U.S. Cl.
CPC ............ *H04L 51/046* (2013.01); *H04L 51/14* (2013.01); *H04L 67/22* (2013.01); *H04L 67/306* (2013.01)

(58) Field of Classification Search
CPC .. G06Q 30/0252; G06Q 20/10; G06Q 20/342; G06Q 20/105; G06Q 20/387; G06Q 20/12; G06Q 20/24; G06Q 40/02; G06Q 40/04; G06Q 40/06; H04W 4/025; H04L 67/02; H04L 67/20; H04L 65/602; H04L 51/32; H04L 43/045; H04L 43/10; H04L 65/403; H04L 67/22; H04L 67/306; H04L 51/046; H04L 51/12; H04L 51/14; H04L 67/12; H04L 67/42; H04L 67/10; H04L 51/10; H04L 65/60; H04L 61/6022; H04L 65/1089; H04L 65/4084; H04L 65/4092; H04L 65/601; G10L 15/1815; G10L 15/1822

See application file for complete search history.

FIG. 6     600

SYSTEM AND METHOD FOR DETERMINING AND DELIVERING BREAKING NEWS UTILIZING SOCIAL MEDIA

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content providing and hosting server systems and/or platforms by modifying the capabilities and enabling non-native functionality to such systems and/or platforms for breaking news detection and personalized delivery.

SUMMARY

The present disclosure provides systems and methods for detecting breaking or trending news stories from social media activity, and alerting users to such news stories via personalized message delivery. The disclosed systems and methods leverage the explosion of social data, expert knowledge and user feedback, all available on-line, to determine breaking news stories, which are then delivered to users in a personalized manner specific to each user.

In accordance with one or more embodiments, a method is disclosed which includes determining, via a computing device, a trusted news source from a plurality of news sources, the trust determination based on a determination that the trusted news source communicates newsworthy content via a social media platform, the trusted news source having an associated framing set comprising information associating the trusted news source with a content type; determining, via the computing device, a plurality of trusted secondary news sources based on the framing set of the trusted news source, the secondary trust determination comprising parsing messages sent by the secondary news sources and identifying content in the messages that matches the framing set information at or above a threshold; analyzing, via the computing device over a network, a plurality of new messages communicated by the trusted secondary news sources, the analysis comprising detecting a topic commonly mentioned in at least a predetermined number of the new messages; identifying, via the computing device over the network, a social media message respectively communicated by a plurality of users; filtering, via the computing device, the social media messages to identify a message subset that is associated with the detected topic and communicated during a predetermined time window, the message subset comprising content associated with a common event; determining, via the computing device, a set of users to be interested in the detected topic, the interest determination based on user data of users on a social media platform; and communicating, via the computing device over a network, a breaking news content message to the set of interested users, the breaking news content message comprising information associated with the common event content.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for breaking news detection and personalized delivery.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
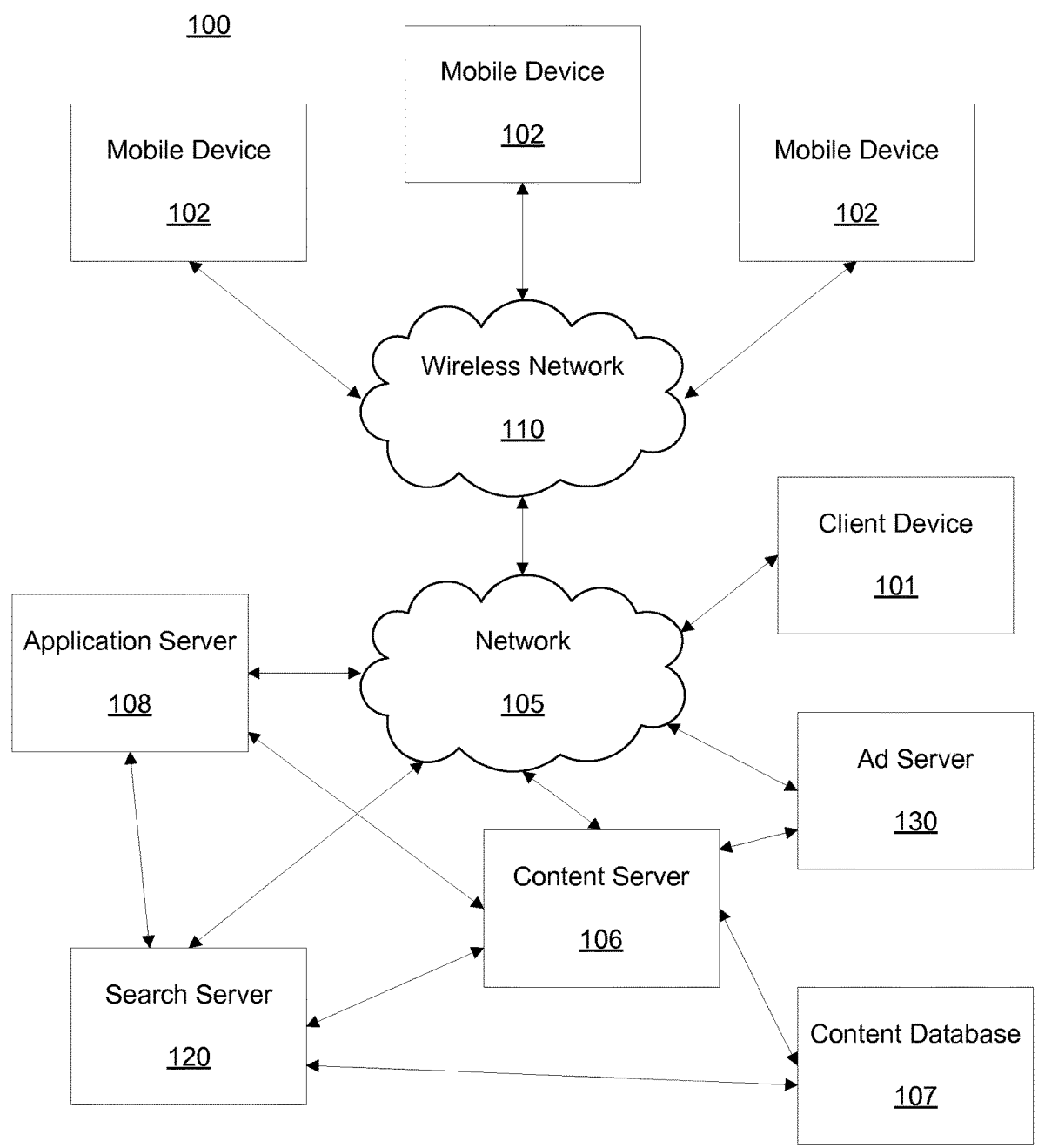
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure provides computerized systems and methods for determining breaking news content from up-to-date social media activity (e.g., trending content or topics on social media websites/platforms), and in turn automatically, in real or in near-real time, communicating such content as a personalized (breaking news) content message to a specific set of online users. The disclosed systems and methods leverage social data, expert knowledge, user feedback information, and/or any other type of online information, or some combination thereof, to determine breaking news stories, which are then delivered to users in a personalized manner specific to each user.

According to embodiments of the present disclosure, the disclosed systems and methods are able to derive which content (and/or types of content) are newsworthy, whether such content is relevant to a set of users, and whether such content is temporally relevant. In other words, for example, the disclosed systems and methods determine which news stories are "hot" or "breaking" news stories that are trending on social media, and based on such determination, notify a specific set of users of the trending story via personalized push messages. It should be understood that the newsworthiness or trending aspect(s) of news stories (i.e., content) is related to any type of content, as the content can be related to sports, finance, politics, business, celebrity news and/or any other type of information that can be reported on a news platform, such as by way of non-limiting example Yahoo!® News Digest.

For purposes of this disclosure, social data, as understood by those of skill in the art, refers to retrieved, accessed, received and/or communicated information from and/or between users on a network. As discussed in more detail below, such information can be derived, determined and/or identified from messages being transmitted and/or posted over the Internet via any type of known or to be known social media or communication platform, such as, but not limited to, Yahoo!® Messenger, Flickr®, Tumblr®, Facebook®, Twitter®, Instagram®, Wikipedia®, or any other type of blog, microblog, news posting, or website or webpage, and the like. For example, such information can be comprised within a user communication, such as a Twitter® message, which can potentially be read by the entire world or anyone on the world-wide Twitter® community. In another example, such information can be comprised within interactions between specific users, such as IM messages, Facebook® messages, and the like.

In line with the above non-limiting examples, in addition to any other known or to be known methodology of users communicating over the Internet, such communications effectively yield knowingly and/or voluntarily generated and/or shared content that can be analyzed, collected and utilized for a variety of purposes, as discussed herein. In some embodiments, the disclosed social data can include and/or be associated with spatial data, temporal data and/or logical data (where the logical data can be extracted from the communications to determine and/or reveal a topic of such communications). Such social, spatial, temporal and/or logical data can be related to and/or generated from a breaking news story, a breaking news source (e.g., newspaper website, journalist's IM or tweet, or user), and the like.

For purposes of this disclosure, reference to a "breaking news story" refers to a current issue that is trending or newsworthy (or noteworthy as topical content). A "breaking news story" (or story) comprises content that warrants interruption of a user's attention, redirection of the user's attention to the breaking story, and/or user notification of such story. In other words, a "breaking news story" refers to a significant story of the moment, a story that is being covered live, a story that is currently developing, or recently occurred (where such recency is based on a temporal threshold that is influenced by the impact such story has on a user(s)). As discussed in more detail below, a breaking or hot news story may be of wide interest to a plurality of users or may only be of interest to a select/determined user(s).

A "breaking news story" can comprise any type of content, such as, text, audio, video, images, or some combination thereof. Users can be notified of, or communicated such stories via any type of communication service or platform. That is, users can receive messages, message alerts and/or message notifications associated with a "breaking news story" by, but not limited to, a news app, email services, photo services, web services, social networking services, news services, third-party services, audio services, video services, instant messaging (IM) services, SMS services, MMS services, FTP services, voice over IP (VOIP) services, or the like.

For example, a user may receive a Facebook® post on his Facebook user page wall comprising text that indicates that a new person has just announced his/her candidacy for the 2016 Presidential election. In another non-limiting example, a user may receive a Twitter® message comprising a video (or URL to the video), or an email comprising a recently posted article on Yahoo!® News in her Yahoo!® Mail inbox indicating the same. As stated above, such message can include any combination of images, text, audio, video, or the like. As such, for purposes of this disclosure, a breaking news story will be referred to as "breaking news content," as any type of content can be related to a trending story/topic.

As such, according to embodiments of the present disclosure, disclosed are systems and methods for breaking news content identification (from trustworthy media sources) and delivery (to specific users). Thus, the disclosed systems and methods enable the communication of high quality, personalized and trending (or the subject of many communications on a social media website within a predetermined range/period of time) content to specific users. As discussed in more detail below, the personalization of the breaking news content can be based on the user's declared interests, derived (or machine inferred) user interests, the user's current, past and/or future location, and the like, or some combination thereof.

As discussed in more detail below, according to some embodiments, information associated with or derived from the breaking news content (e.g., stories), as discussed herein, can be used for monetization purposes and targeted advertising when delivering or enabling access to such content. That is, providing targeted advertising to users associated with the breaking news content they are receiving/viewing can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, search server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including, but not limited to, 2nd (2G), 3rd (3G), and/or 4th (4G) generation radio access for cellular systems (and/or other advances in such technology including, for example, $5^{th}$ (5G) generation radio access), WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, social networking services, news services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-102. In some embodiments, applications, such as a social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
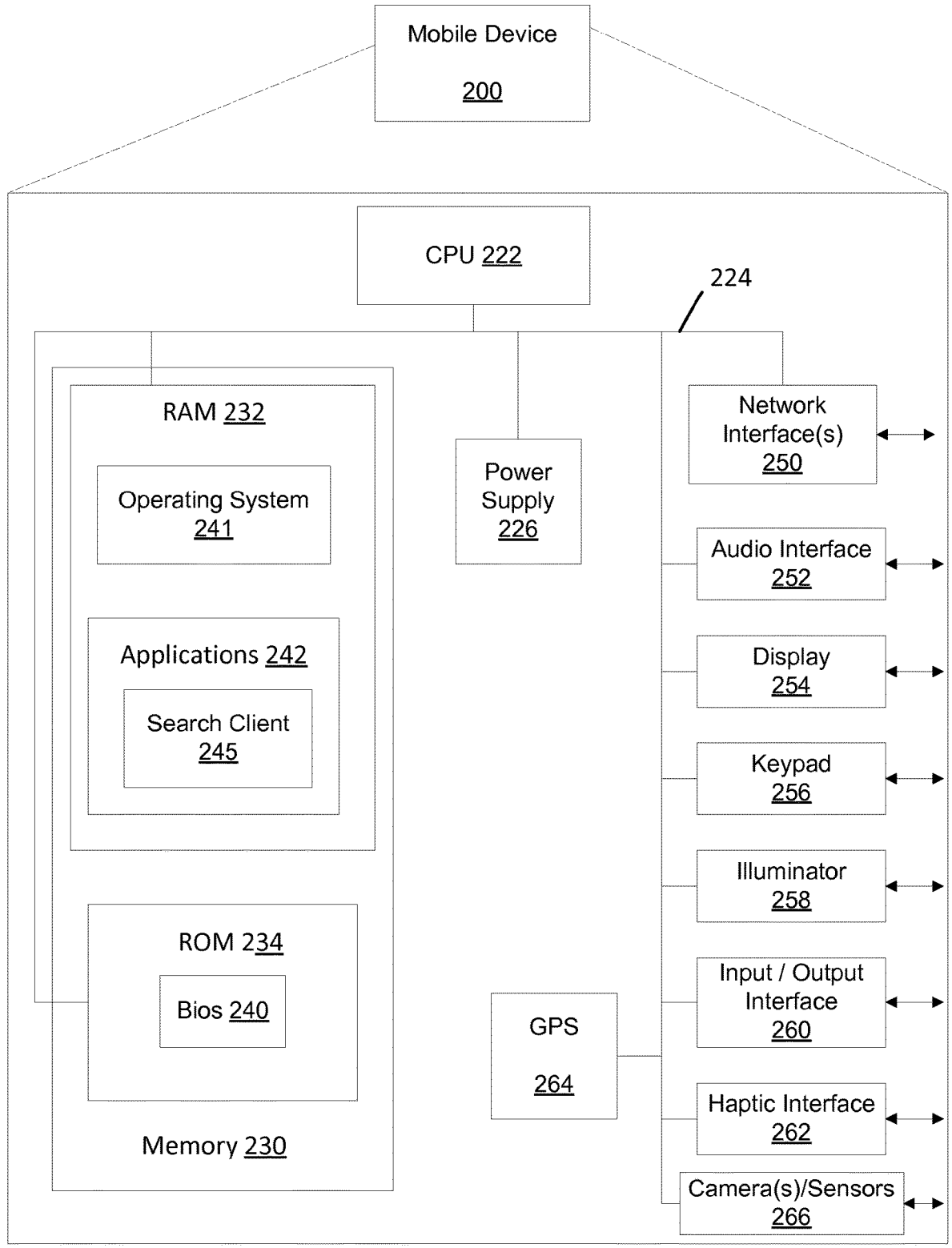
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical or electromagnetic sensors 266. Device 200 can include one camera 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs or "apps" in some embodiments include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 3:
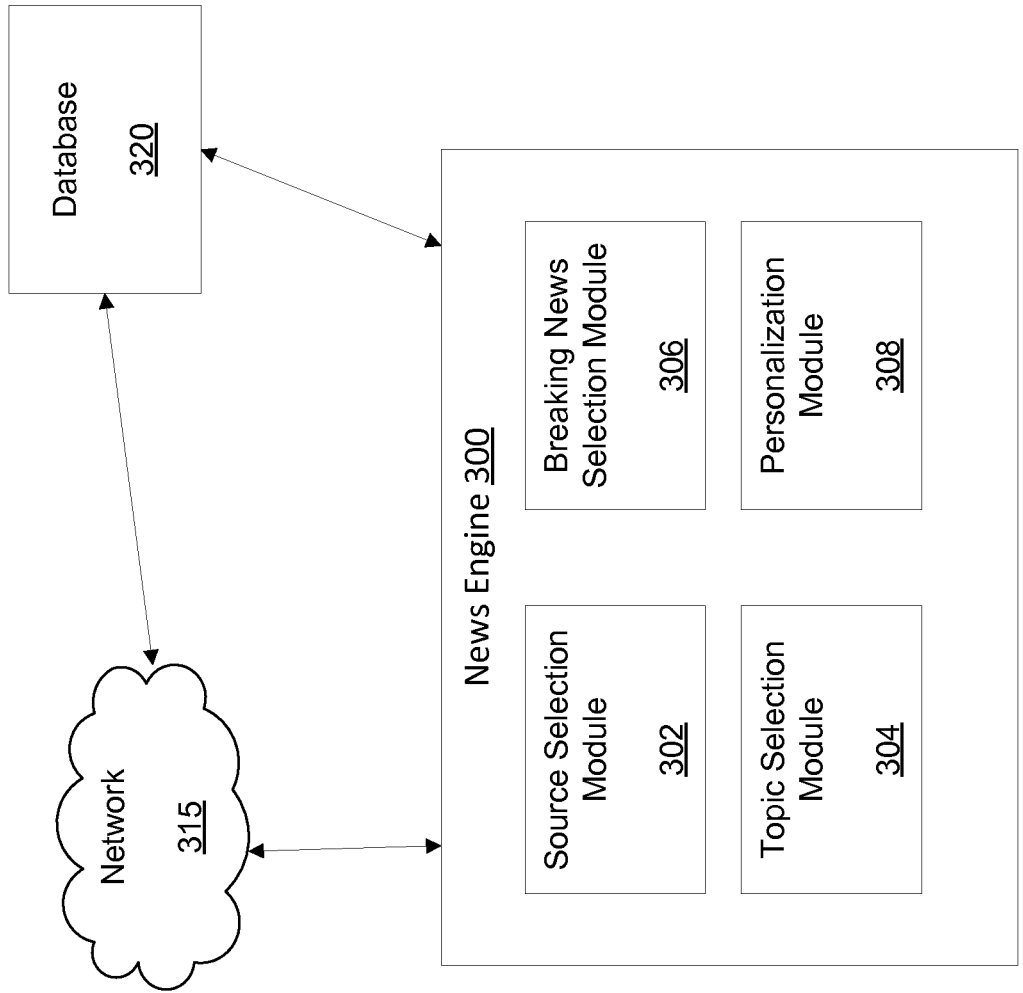
FIG. 3 is a schematic block diagram illustrating components of a system in accordance with embodiments of the present disclosure.

FIG. 3 is a block diagram illustrating the components for performing the systems and methods discussed herein. FIG. 3 includes a news engine 300, network 315 and database 320. The news engine 300 can be a special purpose machine or processor and could be hosted by an application server, social networking server, web server, search server, content provider, email service provider, ad server, user's computing device, and the like, or any combination thereof. The database 320 can be any type of database or memory, and can be associated with a server on a network which is providing breaking news content or associated and/or affiliated content (e.g., content server 106 or application server 108 from FIG. 1).

The database 320 comprises a dataset of information associated with social data (or breaking news data) and associated social metadata, and user data and associated user metadata. Such information can be stored in the database 320 independently and/or as a linked or associated dataset when such information is personalized and delivered to a user, as discussed in more detail below.

According to some embodiments, as discussed above, social data can include, but is not limited to, information associated with breaking news content (i.e., expert knowledge, user feedback and/or social data, and the like), breaking news sources (e.g., a news outlet, for example, CNN®; a social media notification, for example, a Twitter® message or trend, and the like); and the like.

According to some embodiments, user data can include, but is not limited to, information associated with a user's profile, user interests, user behavioral information, user attributes, user preferences, user demographic information, user location information, user biographic information, and the like, or some combination thereof. In some embodiments, the user data can also include, for purposes of delivering the breaking news content to the user, user device information (associated with the connected devices, as discussed below), including, but not limited to, device identifying information, voice/data carrier information, Internet Protocol (IP) address, applications installed or capable of being installed or executed on such device for accessing and receiving breaking news content and/or providing feedback to or initiating a breaking news story, and/or any, or some combination thereof. It should be understood that the data (and metadata) in the database 320 can be any type of information related to a user, content, a device, an application, a service provider, a content provider, whether known or to be known, without departing from the scope of the present disclosure.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the news engine 300, and the database of stored resources 320. Indeed, as illustrated in FIG. 3, the news engine 300 and database 320 can be directly connected by any known or to be known method of connecting and/or enabling communication between such devices and resources.

The principal processor, server, or combination of devices that comprises hardware programmed in accordance with the special purpose functions herein, referred to for convenience as news engine 300, includes a source selection module 302, topic detection module 304, breaking news selection module 306 and a personalization module 308. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 4-5.

Figure 4:
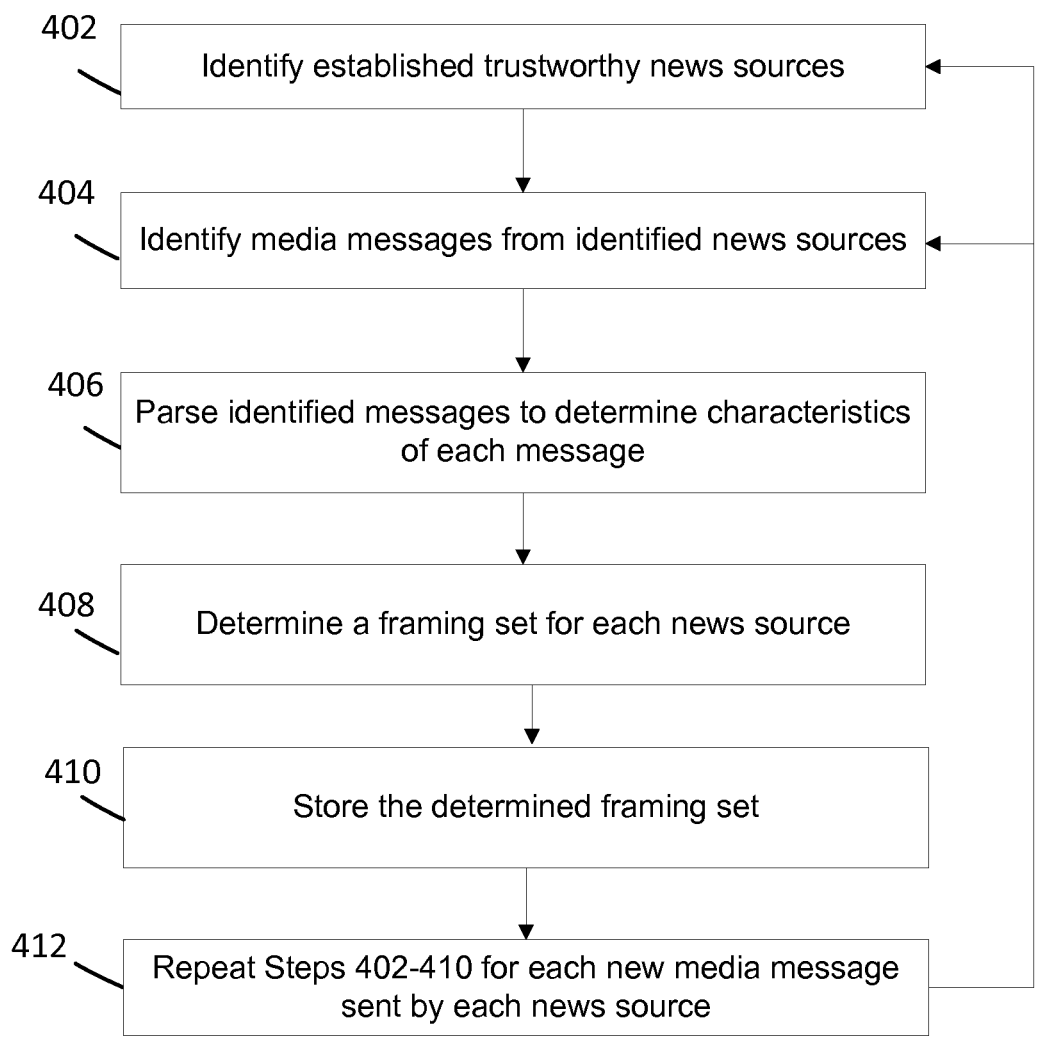
FIG. 4 is a flowchart illustrating steps performed in accordance with some embodiments of the present disclosure.

FIG. 4 is a process 400 diagram illustrating steps performed in accordance with embodiments of the present disclosure for determining and delivering breaking news content to a user. Process 400 details the training of the source selection module 302 of the news engine 300, which is configured as a machine learning system. According to some embodiments of the present disclosure, the source selection module 302 can implement any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like. In some embodiments, the compilation of information by the source selection module 302 (during Process 400) can involve iterative or recursive bootstrapping or aggregation analysis which improves the accuracy of the information derived/detected from messaging analysis, as discussed in more detail below. Indeed, embodiments of the present disclosure involve the support selection module 302 applying any known or to be known open source and/or commercial software machine learning algorithm, technique or technology.

Thus, it should be understood from the below discussion that the machine learning source selection module 302 can perform sophisticated data analysis of all types of online activity by analyzing social data in accordance with a number of factors derived from, inferred from and/or identified from the online activity (or media messages as discussed below), including, but not limited to, context, content, sentiment, confidence, and the like, or some combination thereof. That is, for example, the source selection module 302 interprets and models the media sources sentiment, trustworthiness, following and confidence levels of each source's messages against a respective threshold to determine whether the content posted/shared online satisfies a threshold to warrant a determination that the social media source is newsworthy (or trustworthy), as discussed in more detail below.

As discussed in more detail below, the source selection module 302 also accounts for or considers the time of online activity, as it is generally understood that what is relevant one day (or even one hour) may not be relevant the next. The source selection module 302, as well as the other components/modules of the news engine 302, is able to quickly identify and analyze social data from within such online activity. The source selection module also performs an influence analysis of each social media message (or online activity) to understand the potential impact of the message's source, as a key factor in detecting what is currently trending is not only based on the message being communicated, but also who is originating and/or sharing the communication. Additionally, the source selection module 302 can perform network analysis of the social media messages, in that a determination (and learning) can be performed to understand how the social data within messages, as well as the messages as a whole, migrate, grow (and/or die) on the internet or within an online community. That is, the source selection module 302 can determine how the message data is propagated over the internet, and determine whether such data represents viral activity, and if so, the module 302 can monitor to what extent the message goes viral.

By way of background, as understood by those of skill in the art, social media, such as Twitter®, Facebook® and microblogs, among other types of known or to be known communication platforms, contain rich content from authoritative resources (e.g., established news media, journalist and the like) and non-authoritative resources (e.g., general users, friends, or others general users that are followed) covering a wide range of topics. However, the open nature of these resources and vast amount of data generated daily leads to a noise-to-signal ratio that renders conventional systems unable to recognize "breaking" (or trending or relevant) stories from other types of content being communicated online. As such, Process 400 (as well as Process 500 discussed below) is implemented to remedy the "noise" in social media and news activity, whereby the source selection module 302 is trained to recognize social media content that is relevant, trending and of interest to the user. As discussed below, the source selection module 302 is trained to continuously identify (and select) trustworthy news resources thereby effectively processing social data to detect emerging topics.

Process 400 begins with Step 402 where established trustworthy news sources are identified. The identification and analysis of such sources' activity provides the mechanisms for the source selection module 302 to be trained. That is, news sources that are understood to be, or have an established reputation in the news and/or social media realm are identified. Such news sources include, but are not limited to, any known or to be known media news outlets including newspapers, television stations, associated social media accounts for such outlets, such as a Twitter® account for a news station, radio stations, podcasts, internet websites for such outlets, and the like. For example, media news outlets can include, but are not limited to, Fox News®, New York Times®, Washington Post®, Wall Street Journal®, NBC® Radio, and the like. Additionally, trustworthy news sources can include individual reporters or journalists that work for such outlets, are contractors for such outlets or are otherwise associated with such outlets, as well as journalists that are independent but understood to provide trustworthy news. For example, reporter Richard Engel, who works for NBC News® could be identified as a trustworthy news source. In another example, independent journalist X, who has a verified account on Twitter®, can be viewed as a trustworthy news source.

In some embodiments, identification of a trustworthy news source can be based on pre-selection by the system, a user, administrator, or some combination thereof. In some embodiments, selection/identification of a trustworthy news source can be based on a news source having number of followers/friends on social media (satisfying a threshold), a number of previous messages being shared at or above a threshold, and the like.

In Step 404, after trustworthy news sources are identified, the media such sources has output, or is currently outputting on the Internet is identified. In some embodiments, the media for a source is identified for a predetermined range, and such range can take into account past media messages and/or future media messages. For example, Step 404 can involve the identification of media messages sent from an identified news source over the past month. In other example, Step 404 can involve analyzing the next predetermined number of messages sent by the identified source over the next week.

It should be understood that, for purposes of this disclosure, reference to "media messages", such as those from the trustworthy news sources as well as other sources, can include any type of known or to be known output of media over the internet, such as, but not limited to, articles posted on a website or blog, tweets, posts on social media, emails, IMs, SMS, MMS, and the like. Indeed, media messages can be related to (or originated from) a news sources' own website (such as www.cnn.com), or can be related to (or originated from) a news sources social media account (such as CNN's twitter feed).

In Step 406, each identified media message is parsed to identify characteristics of each message. That is, each message is analyzed in order to identify, among other characteristics, the author, source of message (e.g., from Twitter®, Facebook®, Instagram™, Tumblr® or Yahoo! Mail®, and the like), content (e.g., text, images, video, audio), hashtags, URLs, share count (e.g., tweet and/or retweet count), follower count, user feedback, and/or the like. Such characteristics are used as features to model a framing set, as in Step 408. That is, the machine learning source selection module 302 can be continuously (or periodically) trained to recognize characteristics of messages based on the identified characteristics identified in Step 406. Such training can occur upon a characteristic occurring in a message from a specific news source, and/or from a plurality of news sources at or above a threshold. Such training is not only based on the identified characteristics, but also on the framing set from Step 408 which is stored in Step 410.

The framing set comprises information indicating which characteristics are related to one another, which characteristics occur in media messages of a specific type (or category), which characteristics occur at or above a threshold, and the like. The framing set can be a set of text, words, or other type of content collection, as well as a template indicating an information layout and/or a type/category of content associated with the identified news source. The information associated with a framing set can be stored in database 320 (Step 410), and such storage can be in association with a specific news source, content platform or provider, and the like, or some combination thereof. As such, the framing set determined in Step 408 provides information relaying associations between people, topics, content and content type/category, all derived from the news sources' media messages.

In Step 412, in some embodiments, Steps 402-410 can be repeated for each identified news source, so that the source selection module 302 is continuously modeled and/or retrained with up-to-date information regarding which sources are trustworthy; and in some embodiments, Steps 404-410 are repeated for established trustworthy news sources in order to keep the framing set for each source up-to-date and relevant to the current trends occurring in the world. For example, for every 20 tweets sent by a trustworthy news source, Steps 404-410 can be repeated.

By way of a non-limiting example, journalist Keith Law, a baseball writer for ESPN® is identified as a trustworthy source because, for example, he is a working reporter for the news outlet ESPN® (and/or has verified account on Twitter®, or has a predetermined number of followers on social media, and the like). Mr. Law's tweets are analyzed and the characteristics of his tweets are determined—or which type of information is commonly included in his media messages (above a threshold). For example, his tweets that occur during October typically include the hashtag: #playoffs (because that is when playoff baseball takes place every year). Such information can be stored in database 320 as a framing set specific to the news source (i.e., "Keith Law's Twitter® account") or as a framing set specific to the type of content (i.e., "Baseball news Twitter® account"). Additionally, the framing set information is used to train the source selection module 302 to identify messages having the same hashtag (or similar according to a threshold, or derivation of such, for example: #baseballplayoffs) as relating to the baseball playoffs. As discussed in more detail below in relation to FIG. 5, the training occurring in Process 400 enables the news engine 300 to identify other trustworthy news sources and thereby identify breaking news content from such sources.

Figure 5:
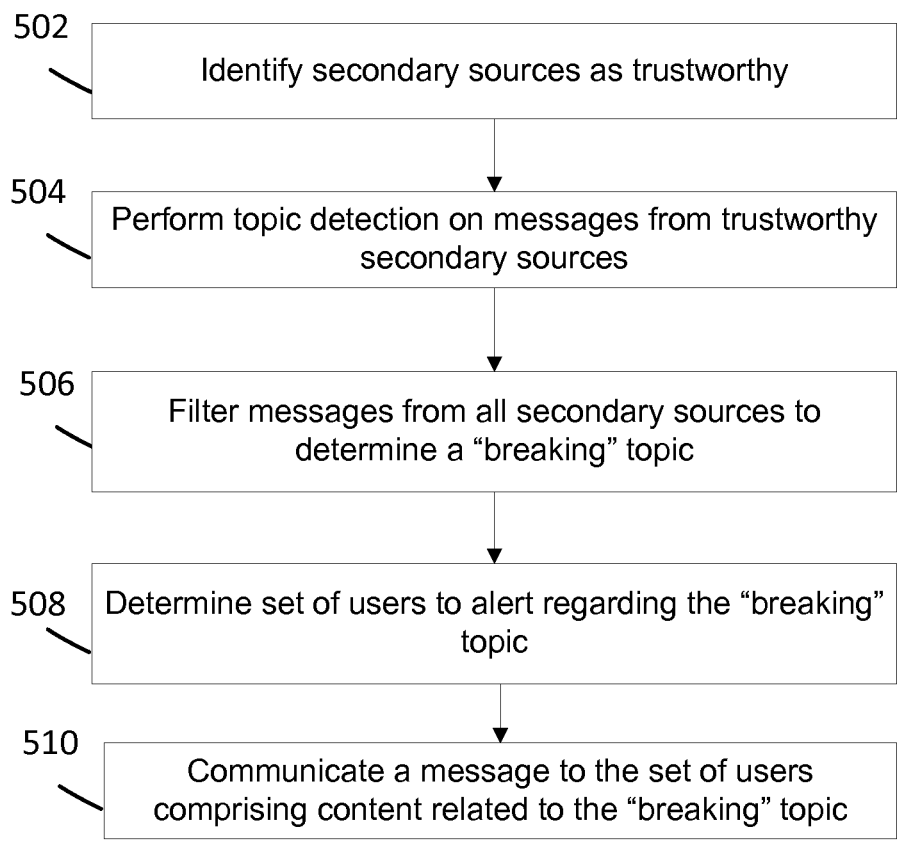
FIG. 5 is a flowchart illustrating steps performed in accordance with some embodiments of the present disclosure.

FIG. 5 is a process 500 diagram illustrating steps performed in accordance with embodiments of the present disclosure for determining and delivering breaking news content to a user. Process 500 details a computerized process for determining breaking news content from up-to-date social media activity (e.g., trending content or topics on social media websites/platforms), and in turn automatically and/or in near-real time communicating such content as a personalized breaking news content message to a specific set of online users. Through the implementation of the trained, machine learning source selection module 302 discussed above in relation to FIG. 4, Process 500 determines which news stories are trending on social media, and based on such determination, notifies a specific set of users of the trending story via personalized push messages.

Process 500 involves the determination of emerging topics (by the topic detection module 304), whereby such topic determination in accordance with the selected news sources (from Process 400) enables the determination and selection of breaking news (by the breaking news selection module 306). As discussed below, the breaking news is then personalized to specific users (by the personalization module 308).

Process 500 begins with Step 502 where the trained machine learning source selection module 302 is applied to secondary sources' media messages to determine which sources are trustworthy (i.e., which sources are communicating or sharing newsworthy content). In other words, Step 502 involves identifying which secondary sources online, or on a communication platform (e.g., Twitter® users, Facebook® users) are trustworthy. Such trustworthy determination is based on applying the learned framing set (from Step 408 above) to media messages sent by secondary sources, which involves comparing content in a media message from the secondary source to a framing set of the source selection module 302.

It should be understood that reference to secondary sources refers to general users of a communication platform. That is, such users may be new media outlets, individual users, and the like, and are currently "unknown," and need to be verified as newsworthy/trustworthy. Therefore, trained source selection module 302 is applied to a (predetermined) number of a secondary source's media messages in order to determine if the source is trustworthy.

For example, building upon the "Keith Law" example above, user Bob sends a number of messages about late breaking news occurring during extra innings of a playoff baseball game. The game is currently "blacked out" in certain markets, and since user Bob is at the game, his messages incur a substantial following. Since Bob has "earmarked" his messages with the hashtag "#playoffs", the comparison of Bob's messages to Keith Law's framing set result in Bob being a trustworthy news source, at least for the baseball playoffs (or the time period of October).

Therefore, in some embodiments, if a user's media message coincide with, match or are similar within a predetermined range/threshold with an established trustworthy source's frame set (or media message's content, context, time and the like), then that user is identified as a trustworthy secondary source.

In Step 504, topic detection is performed on messages from the second sources that are determined to be trustworthy. According to some embodiments, a two-stage emerging topic detection algorithm is applied to a predetermined range of social media activity for a trusted secondary source. Step 504 is performed by the topic detection module 304. In some embodiments, the range of social media activity can be based on a time window, a number of media messages being or have been communicated, a volume of media messages per a user, and the like.

As discussed herein, the two-stage detection occurring in Step 504 includes natural language (NLP) processing of the secondary sources media messages (stage 1) and clustering for topic refinement (stage 2), as discussed herein. According to embodiments of the present disclosure, the NLP processing can be implemented by any known or to be known stochastic, probabilistic, data mining and/or statistical algorithm/technique, such as, for example, Hidden Markov models, as well as computational linguistics, such as, for example, n-grams. For purposes of this discussion NLP processing will be discussed in reference to n-gram analysis; however, it should not be construed to limit the scope of the instant disclosure to solely n-gram applications, as any known or to be known NLP processing technique may be utilized herein without departing from the scope of the present disclosure.

Step 504 involves (in stage 1) extracting content from the media messages of the trusted secondary sources. As discussed above, the number of messages satisfies a predetermined threshold of messages, whereby such threshold ensures that the system is not bottlenecked with the analysis of one source's messages in addition to ensuring that the messages being analyzed are recent (e.g., last 2-3 days of messages). Indeed, embodiments exist where the threshold period of messages is adjusted based on the number of messages being sent, in that if a source is sending a high volume of messages each day, the period of identification and extraction would be shorter than if the user were sending fewer messages a day.

Thus, stage 1 of Step 504 involves identifying a number of messages from a trusted secondary source and extracting the content from such messages. The extraction is based on NLP processing resulting in the messages being "cleaned." In some embodiments, a contiguous sequence of n items (or tokens) from a given message is identified, where the items can be, for example, phonemes, syllables, letters, words, base pairs, symbols, URLs, and the like. These items are extracted via the NLP processing algorithm, and "stop words" are removed. "Stop words," which are words typically filtered out before, during or after processing of natural language data (e.g., text), are stored in a dictionary in the database 320 and are compared to the media messages to determine if they appear in such messages. Stop words can include, but not limited to, "a," "the," "is," "at," "we," "which," "on" and the like. In some embodiments, stop words can also be category specific. For example, for a sports category, stop words can include "game," "team" and the like. In another example, for a business category, stop words can include "finance," "company" and the like.

After removal of the "stop words" from the media message, an n-gram, for example, can be applied to the n items remaining to determine specific topics from within the n item list (derived from a media message). The topic items are compiled, and a counter is implemented to determine if reference to a specific topic item satisfies a threshold for a predetermined time window.

In some embodiments, determination of the contiguous sequence of items involves converting (or encoding or translating) the text (or content) to tokens, for efficient NLP processing of the media message. The key for converting (and re-converting as discussed below) words to tokens is stored in database 320. Therefore, each topic item can be associated with a token that identifies the word/content associated with the topic, the timing of the topic and the source of the topic generation.

By way of a non-limiting example, user Jim sends out a series of tweets related to a recent snow storm occurring in the Northeast. One of Jim's tweets reads: "We have at least 1 foot of snow in New York today"; and another reads "I just shoveled my driveway and we had 1 foot of snow." In view of stage 1 of Step 504, Jim's tweets are compiled into an n item list of text, and the stop words are removed. For example, from Jim's first tweet, the stop words "we," "have," "at," "of" and "in" are removed; therefore the n item list includes: "1 foot" "snow" "New York" "today". These are topic items and when each word's counter satisfies a threshold, such words can be deemed as an emerging topic. For example, if the threshold is 2, and Jim's second tweet was sent within the predetermined time window (e.g., within 1 hour), reference to "1 foot" of "snow" in Jim's second tweet can lead the topic detection module 304 to identify "1 foot" "snow" as topic items that may be related to an emerging topic.

Stage 2 of Step 504 involves applying the learning topic items (or tokens) to other media messages of other trusted secondary sources to determine (or confirm) that a topic is "breaking" (or trending). In some embodiments, when the items are converted to tokens representing the content from the original message, in order to perform stage 2 of Step 504, the tokens must be converted back to original text (or inverted or decoded). Performance of stage 2 of Step 504 can be implemented by any known or to be known clustering algorithm, such as, but not limited to, data mining, statistical data analysis, pattern recognition, image analysis, hierarchical clustering, linkage clustering, k-means clustering, and the like.

Thus, stage 2 of Step 504 involves clustering topic items from media messages from an array of trusted secondary sources. Clustering can be based on a variety of factors including, but not limited to, geographic area, time, user data, content of messages, context of topics, and the like. For example, building upon the example above related to Jim's snow tweets, user Jane also lives in the Northeast, but in Long Island. She posts messages on her Facebook® page stating, among other messages: "2 feet of snow here in the Northeast" and "more than 2 feet in Long Island." Performance of state 1 of Step 504 reveals that the topic items of Jane's messages are: "2 foot" and "snow". Since Jim and Jane are located in a similar geographic area (i.e., New York State) for purposes of a snow storm, and their tweets are occurring during the same time period, the topic items of "1 foot", "2 feet" and "snow" can be clustered (according to stage 2).

Thus, the clustering of topic items in stage 2 of the items determined in stage 1 validates and refines the topics of potential emerging (trending) topics, or common events. In some embodiments, the topic items (or tokens) may be tagged or otherwise associated with identifying metadata and stored (as social data) in database 320. Such storage can be associated with the generating user of the topic item, spatial data related to the topic (e.g., regional information), temporal information (timing window), and/or as a cluster having all related information associated therewith.

In Step 506, messages from all secondary sources are filtered to determine a "breaking" (or trending) topic. Step 506 is performed by the breaking news selection module 306. Specifically, Step 506 involves utilizing the detected topic items (from Step 504) to filter all social media activity occurring during a predetermined time period. In some embodiments, the time period for such filtering coincides with the time period (or window) for determining a topic item. In some embodiments, Step 506 can include monitoring social media activity occurring during the predetermined time window to determine messages associated with the breaking topic, as discussed herein.

In some embodiments, Step 506's filtering includes analyzing social media activity during the time period/window to determine whether the topic items are present in any or a threshold number of messages. Such messages can be, for example, user feedback related to an original message (such as a retweet, "like," sharing of an original message or a determined click-through rate (CTR) of an original message which indicates how many users have read such message), a message from an established trustworthy source, or entirely new messages including the same or similar (satisfying a threshold) content from any source, and the like.

For example, building upon the above examples of Jim and Jane's messages about snow in New York, where the topic items of "1 foot", "2 feet" and "snow", user feedback respective to Jim and Jane's messages, in addition to other messages from other senders are analyzed to determine if the topic items appear at or above a threshold. For example, 100 users have retweeted Jims' first tweet about the snow storm, and 75 users have "liked" Jane's Facebook® post. For sake of this example, assume that the retweets and "likes" have occurred within a predetermined time window (e.g., within 1 hour). However, the threshold number of user feedback was 90 (on a counter) within the 1 hour window; therefore, the feedback for Jim's tweets have satisfied the filtering threshold, and the feedback for Jane's messages have not. Therefore, based on such filtering, a "breaking" topic is the: 1 foot of snow in New York (from Jim's tweet); not the 2 feet in Long Island (from Jane's post).

In some embodiments, the filtering of Step 506 can be associated with other trusted sources. For example, using Jim and Jane's messages example again, if Yahoo!® News posts an article about the NY snow storm, since this message attributed to an established trustworthy news source (from step 402 above), then this serves as confirmation that the tweets of Jim and/or Jane are related to "breaking" news.

Thus, Step 506 filters out the "noise" of less significant news (or topic items) based on analyzed user engagement of the determined topic items (from Step 504). This enables "breaking" or trending news (or content) to be adaptively and dynamically selected as seasons, environment and any other type of external human or society factors change. The result of Step 506 is the identification of a breaking news topic (corresponding to breaking news content) that is to be transmitted to specific users, which is determined in Step 508.

Thus, Step 508 involves determining a set of users (or a single user) to alert regarding the breaking news topic. Step 508 is performed by the personalization module 308. According to embodiments of the present disclosure, Step 508 involves determining which users on a network would find the breaking topic to be of interest to them. Such determination is based on an analysis of the user data stored in database 320. As discussed above, user data can be associated with, identified and/or derived from any type of communication platform, communication platform, content provider and the like (such as, a user's Tumblr® account). The user data can include, but is not limited to, information associated with a user's profile, user interests, user behavioral information, user attributes, user preferences, user demographic information, user location information, user biographic information, and the like, or some combination thereof. As illustrated below, such user data can reveal the user's online activity—i.e., what the user is reading, where the user is located, what the user is writing (or sharing online), how the user consumes information on a network or platform, and the like.

Thus, Step 508 involves the application of any type of known or to be known algorithm, technique or technology related to statistical analysis, data mining, hash tree analysis, vector analysis, behavioral analysis and/or targeting analysis and the like. As such, Step 508 involves analyzing the user data specific to a user to determine whether the user has expressed an interest in the breaking topic. Such analysis can include, for example, formulating an n-dimensional vector to represent a user's interest (from the user data) and an n-dimensional vector to represent the breaking topic(s). Comparison of the vectors to one another resulting in an overlap of vector points (or coordinates) would reveal the user's interest in a breaking topic.

By way of a non-limiting example, Bill's user data reveals that he lives in New York City and enjoys sledding. Such interest may be derived, for example, from Bill's profile on Yahoo!® and from analysis of his emails to his wife or tweets to his friends/followers. As such, the breaking topic about the snow storm in New York would be of interest to Jim.

In another non-limiting example, Jill's user data reveals that she lives in Texas and is scheduled to fly to New York tomorrow (during the snow storm). As such, the breaking topic about the snow storm would be of interest o Jill (in advance of her trip). However, if Jill did not have a trip planned, the breaking topic would not be of interest to Jill.

According to some embodiments, Step 508 can involve clustering users together that are determined to be interested in a breaking topic. As such, for example, even though Bill and Jill have almost nothing in common, they are jointly interested in the snow storm in New York due to Jill's current circumstances, and therefore will be clustered together to form the set of users that will receive the breaking news content message about the snowstorm.

In Step 510, the breaking news content message is communicated to the determined set of users (e.g., Jill and Bill from the above examples). Step 510 is also performed by the personalization module 308. According to some embodiments of the present disclosure, the breaking news content message is a push message sent to each of the set of users' devices.

According to embodiments of the present disclosure, the breaking news content message is communicated to the users via the user's "connected" devices, which can include, but are not limited to, the user's personal computers, laptops, mobile phones, phablets, tablets, wearable computers, smart watches, and the like. Identification of such devices can be based on the user data for each user. That is, as discussed above, user data can also include, for purposes of delivering the breaking news content messages to the user, information related to a user's device(s), including, but not limited to, device identifying information, voice/data carrier information, Internet Protocol (IP) address, applications installed or capable of being installed or executed on such device for accessing and receiving breaking news content and/or providing feedback to or initiating a breaking news story, and/or any, or some combination thereof.

According to embodiments of the present disclosure, the notification of a breaking topic as a breaking news content message can include, but is not limited to, forwarding an existing breaking news message, quoting an existing message in another/new message, generating a new message comprising the same or similar (according to a threshold) content, and the like. In some embodiments, communication of the message to the users can also involve determining a preferred application or platform for retrieval. Such determination can be based on the analysis performed in Step 508 from the user data for each of the set of users.

By way of a non-limiting example, building upon the above example, Bill's preferred form of online communication, or preferred way of consuming social and/or news media information (derived from his messaging activity) is Twitter®. As such, Bill will be alerted to the snowstorm via a tweet. Such tweet may be a retweet, shared tweet, favorite tweet, quoted tweet, direct message, or any other type of communication where Bill can be alerted via Twitter®. According to some embodiments, such message may be generated (e.g., shared) via a Yahoo!® account on Twitter® dedicated to an application (e.g., news engine 300) for determining breaking news, as discussed herein. Therefore, the Yahoo!® account on Twitter® may simply retweet Jim's original tweet and insert Bill's Twitter® handle (for example: "@Jim We have at least 1 foot of snow in New York today" @Bill).

According to some embodiments, the breaking news content message can be communicated to the set of users via any known or to be known messaging platform. The communication of Step 510 can involve sending each user a message on all applicable communication platforms per user (determined from the user data of each user), and/or can involve sending each user the same message on the same platform (or on his/her preferred platform, as discussed above), and the like.

Figure 6:
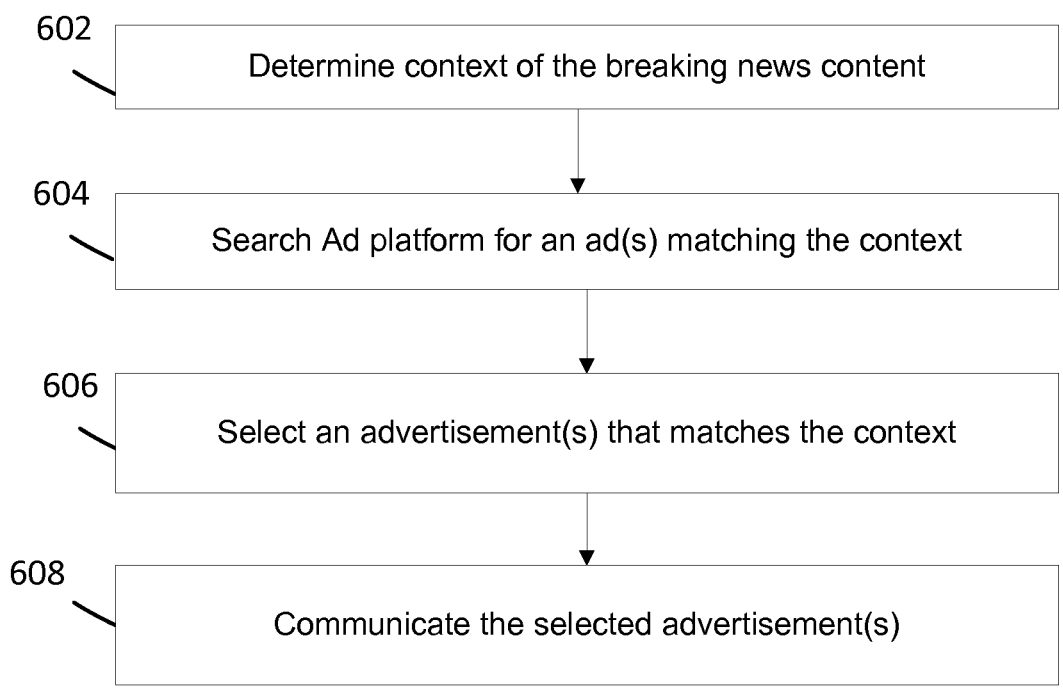
FIG. 6 is a flowchart illustrating steps performed in accordance with some embodiments of the present disclosure.

FIG. 6 is a work flow 600 for serving relevant advertisements based on the content of a breaking news story (i.e., breaking news content), as discussed above in relation to FIGS. 3-5. By way of a non-limiting example, work flow 600 enables a user receiving a breaking news story about the latest Yankees vs. Red Sox game on his mobile phone, whereby an advertisement associated with tickets for the teams' next game, or an advertisement for MLB® merchandise can be displayed in association with such breaking news delivery.

In Step 602, a context is determined based on either the content associated with, derived or extracted from the breaking news story identified as "of interest" to a user (as discussed above). This context forms a basis for serving advertisements having a similar context (i.e., relating to the type of content). Thus, Step 602 can involve determining a content type associated with the breaking news story, a content category associated with the news story, and the like.

In some embodiments, the identification of the context from Step 602 may occur during identification of a breaking news story, after identification of the news story, and/or after or before communication of the breaking news content message, or some combination thereof. In Step 604, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 604, the advertisement server 130 searches the ad database for advertisements that match the identified context. In Step 606, an advertisement is selected (or retrieved) based on the results of Step 604. In some embodiments, the advertisement can be selected based upon the result of Step 604, and modified to conform to attributes of the page or method upon which the advertisement will be displayed, and/or to the application and/or device for which it will be displayed. In some embodiments, as in Step 608, the selected advertisement is shared or communicated via the application the user is utilizing to access the breaking news content message. In some embodiments, the selected advertisement is sent directly to each user's computing device. In some embodiments, the selected advertisement is displayed in conjunction with the breaking news content message on the user's device and/or within the application being used to access the news delivery.

Figure 7:
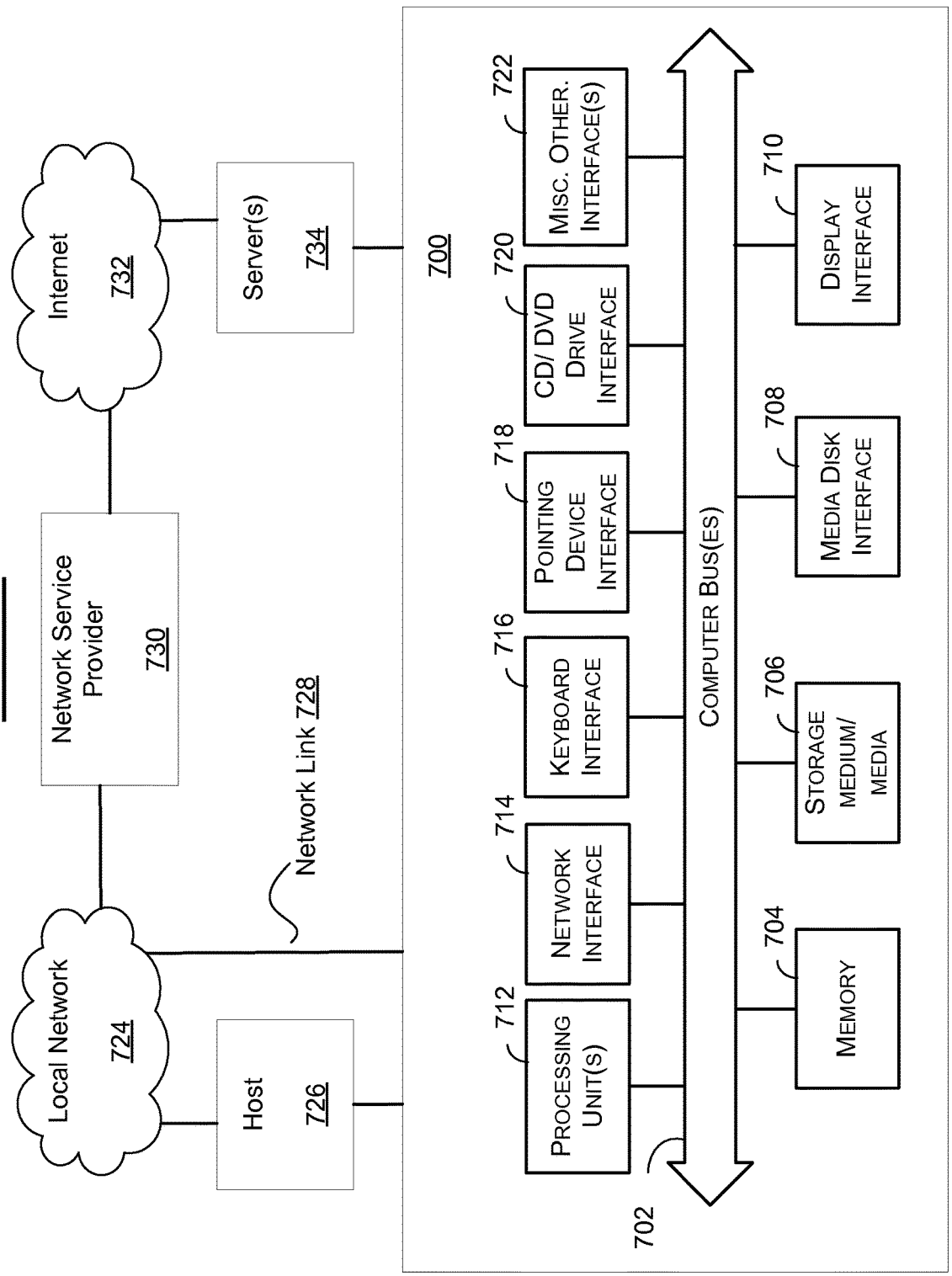
FIG. 7 is a block diagram illustrating architecture of a hardware device in accordance with one or more embodiments of the present disclosure.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    determining, via a computing device, a trusted news source from a plurality of news sources, said trust determination based on a determination that the trusted news source communicates newsworthy content via a social media platform, said trusted news source having an associated framing set comprising information associating the trusted news source with a content type;
    determining, via the computing device, a plurality of trusted secondary news sources based on the framing set of the trusted news source, said secondary trust determination comprising parsing messages sent by the secondary news sources and identifying content in said messages that matches the framing set information at or above a threshold;
    analyzing, via the computing device over a network, a plurality of new messages communicated by the trusted secondary news sources, and based on said analysis, detecting a topic commonly mentioned in at least a predetermined number of the new messages;
    identifying, via the computing device over the network, a social media message respectively communicated by a plurality of users;
    filtering, via the computing device, the social media messages communicated by the plurality of users;
    identifying, based on said filtering of the social media messages communicated by the plurality of users, via the computing device, a message subset, each message in the message subset comprising content associated with a common event, each message in the message subset being associated with the detected topic and communicated during a predetermined time window that commences upon the detection of the topic commonly mentioned in at least the predetermined number of new messages;
    analyzing, via the computing device, user data of users on a social media platform, said user data providing indications of online and real-world activity performed by the user, said analysis comprising parsing said user data based on said content of the message subset;
    determining, via the computing device, based on said analysis, a set of users to be interested in said detected topic;
    generating, via the computing device, a new message serving as a breaking news content message, said new message comprising at least said content of the message subset; and
    communicating, via the computing device over a network, the new message to said set of interested users.

2. The method of claim 1, wherein said topic detection comprises:
    extracting content from each of said plurality of new messages, said extracting comprising determining a contiguous sequence of items from said content;
    performing natural language processing (NLP) on the extracted content, said NLP comprises identifying stop words, where the items associated with said stop words are removed from said sequence; and determining relationships between items associated with remaining content in each sequence that satisfy a topic threshold.

3. The method of claim 2, further comprising:
clustering each item satisfying the topic threshold based on said relationships, said clustered items being associated with a common category, wherein said detected topic is associated with said common category.

4. The method of claim 1, further comprising:
identifying a plurality of messages sent by said trusted news source via the social media platform;
parsing each of said plurality of messages from the trusted news source to identify characteristics of each message, said characteristics being said information associating the trusted news source with the content type, wherein said framing set is based on said characteristics of each message communicated by the trusted news source; and
storing said framing set in a database in association with said trusted news source.

5. The method of claim 4, wherein said identifying and parsing steps are performed for each identified trusted news source across a plurality of social media platforms.

6. The method of claim 1, wherein said trusted news source is determined to be newsworthy based on information selected from a group consisting of: the trusted news source having a number of followers or friends on the social media platform satisfying a threshold, the trusted news source's messages have been shared, quoted or forwarded a predetermined number of times during a threshold time period, the trusted news source is a verified user of a the social media platform, and the trusted news source is associated with an established media outlet.

7. The method of claim 1, wherein said new message is a push message, and said communication comprises facilitating sending the new message via at least one social media platform associated with each of the set of users.

8. The method of claim 1, wherein said communication of the new message comprises a message selected from a group consisting of: forwarding a message comprising content associated with said detected topic, quoting a message comprising content associated with said detected topic, generating a new message comprising content associated with said detected topic, and referencing a message comprising content associated with said detected topic.

9. The method of claim 1, wherein said plurality of new messages communicated by the trusted secondary news sources comprises social media activity occurring across a plurality of social media platforms.

10. A non-transitory computer-readable storage medium tangibly encoded with computer-executable instructions, that when executed by a processor associated with a computing device, performs a method comprising:
determining a trusted news source from a plurality of news sources, said trust determination based on a determination that the trusted news source communicates newsworthy content via a social media platform, said trusted news source having an associated framing set comprising information associating the trusted news source with a content type;
determining a plurality of trusted secondary news sources based on the framing set of the trusted news source, said secondary trust determination comprising parsing messages sent by the secondary news sources and identifying content in said messages that matches the framing set information at or above a threshold;

analyzing, over a network, a plurality of new messages communicated by the trusted secondary news sources, and based on said analysis, detecting a topic commonly mentioned in at least a predetermined number of the new messages;
identifying, over the network, a social media message respectively communicated by a plurality of users;
filtering the social media messages communicated by the plurality of users;
identifying, based on said filtering of the social media messages communicated by the plurality of users, a message subset, each message in the message subset comprising content associated with a common event, each message in the message subset being associated with the detected topic and communicated during a predetermined time window that commences upon the detection of the topic commonly mentioned in at least the predetermined number of new messages;
analyzing user data of users on a social media platform, said user data providing indications of online and real-world activity performed by the user, said analysis comprising parsing said user data based on said content of the message subset;
determining, based on said analysis, a set of users to be interested in said detected topic;
generating a new message serving as a breaking news content message comprising information associated with said common event content; and
communicating, over a network, the new message to said set of interested users.

11. The non-transitory computer-readable storage medium of claim 10, wherein said topic detection comprises:
extracting content from each of said plurality of new messages, said extracting comprising determining a contiguous sequence of items from said content;
performing natural language processing (NLP) on the extracted content, said NLP comprises identifying stop words, where the items associated with said stop words are removed from said sequence; and
determining relationships between items associated with remaining content in each sequence that satisfy a topic threshold.

12. The non-transitory computer-readable storage medium of claim 11, further comprising:
clustering each item satisfying the topic threshold based on said relationships, said clustered items being associated with a common category, wherein said detected topic is associated with said common category.

13. The non-transitory computer-readable storage medium of claim 10, further comprising:
identifying a plurality of messages sent by said trusted news source via the social media platform;
parsing each of said plurality of messages from the trusted news source to identify characteristics of each message, said characteristics being said information associating the trusted news source with the content type, wherein said framing set is based on said characteristics of each message communicated by the trusted news source; and
storing said framing set in a database in association with said trusted news source.

14. The non-transitory computer-readable storage medium of claim 13, wherein said identifying and parsing steps are performed for each identified trusted news source across a plurality of social media platforms.

15. The non-transitory computer-readable storage medium of claim 10, wherein said trusted news source is determined to be newsworthy based on information selected from a group consisting of: the trusted news source having a number of followers or friends on the social media platform satisfying a threshold, the trusted news source's messages have been shared, quoted or forwarded a predetermined number of times during a threshold time period, the trusted news source is a verified user of a the social media platform, and the trusted news source is associated with an established media outlet.

16. The non-transitory computer-readable storage medium of claim 10, wherein said new message is a push message, and said communication comprises facilitating sending the new message via at least one social media platform associated with each of the set of users.

17. The non-transitory computer-readable storage medium of claim 10, wherein said communication of the new message comprises a message selected from a group consisting of: forwarding a message comprising content associated with said detected topic, quoting a message comprising content associated with said detected topic, generating a new message comprising content associated with said detected topic, and referencing a message comprising content associated with said detected topic.

18. The non-transitory computer-readable storage medium of claim 10, wherein said plurality of new messages communicated by the trusted secondary news sources comprises social media activity occurring across a plurality of social media platforms.

19. A system comprising:
a processor; and
a non-transitory computer-readable storage medium for tangibly storing thereon program logic for execution by the processor, the program logic comprising:
logic executed by the processor for determining a trusted news source from a plurality of news sources, said trust determination based on a determination that the trusted news source communicates newsworthy content via a social media platform, said trusted news source having an associated framing set comprising information associating the trusted news source with a content type;
logic executed by the processor for determining a plurality of trusted secondary news sources based on the framing set of the trusted news source, said secondary trust determination comprising parsing messages sent by the secondary news sources and identifying content in said messages that matches the framing set information at or above a threshold;
logic executed by the processor for analyzing, over a network, a plurality of new messages communicated by the trusted secondary news sources, and based on said analysis, detecting a topic commonly mentioned in at least a predetermined number of the new messages;
logic executed by the processor for identifying, over the network, a social media message respectively communicated by a plurality of users;
logic executed by the processor for filtering the social media messages communicated by the plurality of users;
logic executed by the processor for identifying, based on said filtering of the social media messages communicated by the plurality of users, a message subset, each message in the message subset comprising content associated with a common event, each message in the message subset being associated with the detected topic and communicated during a predetermined time window that commences upon the detection of the topic commonly mentioned in at least the predetermined number of new messages;
logic executed by the processor for analyzing, via the computing device, user data of users on a social media platform, said user data providing indications of online and real-world activity performed by the user, said analysis comprising parsing said user data based on said content of the message subset;
logic executed by the processor for determining, based on said analysis, a set of users to be interested in said detected topic;
logic executed by the processor for generating a new message serving as a breaking news content message comprising information associated with said common event content; and
logic executed by the processor for communicating, over a network, the new message to said set of interested users.

* * * * *